Figure 1:
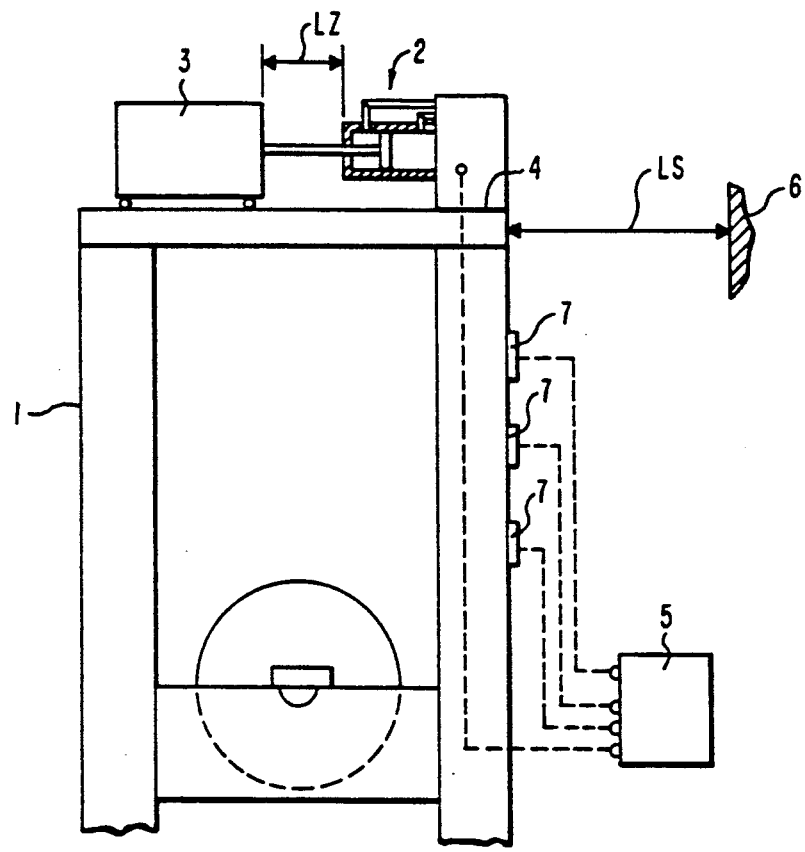

United States Patent [19]
Arnhold et al.

[11] Patent Number: 5,096,541
[45] Date of Patent: Mar. 17, 1992

[54] METHOD FOR ACTIVELY DAMPING VIBRATIONS ON A PAPER-MAKING MACHINE

[75] Inventors: Andreas Arnhold, Weingarten; Rudolf Münch, Ravensburg, both of Fed. Rep. of Germany

[73] Assignee: Sulzer-Eschwer Wyss GmbH, Ravensburg, Fed. Rep. of Germany

[21] Appl. No.: 424,117

[22] Filed: Oct. 19, 1989

[30] Foreign Application Priority Data

Oct. 28, 1988 [DE] Fed. Rep. of Germany ....... 3836746

[51] Int. Cl.$^5$ .............................................. D21G 7/00
[52] U.S. Cl. ....................................... 162/199; 162/278; 248/559; 248/638
[58] Field of Search ................ 162/199, 272; 248/559, 248/638, 562

[56] References Cited

U.S. PATENT DOCUMENTS

| | | | |
|---|---|---|---|
| 4,420,371 | 12/1983 | Dahl et al. | 162/272 |
| 4,429,496 | 2/1984 | Marsi | 248/638 |
| 4,841,685 | 6/1989 | Marsi et al. | 248/638 |

FOREIGN PATENT DOCUMENTS 61-294238 12/1986 Japan .................... 248/638

*Primary Examiner*—Richard V. Fisher
*Assistant Examiner*—Todd J. Burns
*Attorney, Agent, or Firm*—Paul E. Kudirka

[57] ABSTRACT

The method serves for actively damping vibrations on a paper-making machine. The kinematic quantities which describes the movements of the paper-making machine or parts thereof produced by the vibrations are measured and are processed as measurement signals. Between relatively movable masses, at least one of which belongs to the vibratable structure of the paper-making machine, is provided at least one servo motor which is controlled by a control unit. Movement of this servo motor is produced in such a way that it is directed opposite to the vibrational movement to be damped. The movement produced in this way for damping the vibrations can be produced both between parts of the paper-making machine and between part of the paper-making machine and a movable additional mass provided expressly for this purpose. A damper which can also be incorporated into the servo motor can be provided to reduce the vibrational energy. The force effect of the servo motor can be caused for example by a pressure medium, by piezo crystals or by magnetostrictive elements. If necessary, several natural forms of vibrations which occur on the paper-making machine structure to be damped can be damped by means of the method.

27 Claims, 4 Drawing Sheets

METHOD FOR ACTIVELY DAMPING VIBRATIONS ON A PAPER-MAKING MACHINE

The invention concerns a method for damping vibrations.

Paper-makng machines contain inter alia a system of loadbearing, mainly fixed components, the so-called frame and moving parts, in particular rollers, cylinders, drive mechanisms and wires such as for transporting a web as well as medium-conducting components, in particular breastbox, tanks and pipes which are connected to each other or mounted on each other at certain points. It has long been known that during operation of a paper-making machine, vibrations may occur which may arise from the moving or medium-conducting components or be caused by the environment of the paper-making machine. These vibrations are a great disadvantage to functioning of the paper-making machine as well as to the environment of the paper-making machine, e.g. foundations. Naturally every manufacturer of such paper-making machines endeavours to avoid vibrations arising, e.g. by carefully balancing the rotating parts. Nevertheless vibrations cannot be prevented from arising. Such vibration mainly affect quite particular structures of the paper-making machine, that is, parts which can be excited separately.

It is easy to see that due to the large number of possible causes of the vibrations and due to the different designs of the vibratable structures, it must be assumed that the vibrations can occur at different, varying and hardly predictable frequencies.

Methods or devices by means of which such vibrations are to be damped are already known. For example, German patent 3 316 008 C2 describes a device with two or more vibration dampers which each contain an additional weight attached to resilient frames and can be fixed to the breastbox in a special way. Said additional weight is caused by the movement of the breastbox likewise to undergo movements. The advantages of a plurality of such vibration dampers each with different natural frequencies are mentioned too. The known device however can be effective only in a narrow frequency band and split the resonance peaks in the vicinity of the natural frequency of the component to be damped. Desirable conversion of vibration energy, e.g. to heat, is possible only to a very small extent by self-damping of the spring frames, if any.

If a method with an additional weight is used, then when adjusting the size of the additional weights the quantity of the main mass must be taken into consideration amongst other things, that is, the vibratable mass of the paper-making machine structure to be damped. Up to now, it has not been possible to avoid making such additional weights relatively large in case of heavy structures to be damped. But on the other hand, e.g. for reasons of constructional expenditure it is desirable to keep the additional weights as small as possible.

The invention is intended to achieve the object of improving the state of the art to the effect that all annoying vibrations are absorbed to a high extent, if possible completely, irrespective of the frequency at which they occur. In this case no additional vibrational forces are to be transmitted to the environment of the paper-making machine, e.g. the foundations or building walls. Furthermore, the mass of any additional weight used is to be kept as small as possible.

The present invention includes a method for damping vibrations on a paper-making machine, by which method relatively movable masses, at least one of which belongs to the vibratable structure of the paper-making machine and wherein mobility can be produced by guides or by elastic deformability, are connected to each other by at least one force-applying element of variable form, the applied force of which is directed against movement of the vibrations, wherein the force-applying element of variable form is a servo motor which is controlled by a control unit for processing signals which are obtainable by measurement of kinematic quantities of the relatively movable masses. This method is referred to below as "the first aboved-described method".

For the first above-described method, a damper can be provided for damping relative movement of the masses. For the first above-described method, the at least one force-applying element can be adapted to act on the paper-making machine structure in such a manner as to couple two parts of the paper-making machine together. When the at least one force-applying element is so adapted, at least one of the coupled parts can belong to the frame. For the situation described in the immediately preceding sentence, at least one of the coupled parts can belong to the medium-conducting parts. Alternatively, at least one of the coupled parts can be a mounted rotatable part of the paper-making machine, and the servo motor can then be adapted to act on the mounting thereof which then has limited movement. Alternatively, at least one of the coupled parts can be a rotatable part of the paper-making machine mounted on at least one hydraulic supporting element, and at least one supporting element can then be drivable as a servo motor.

For the method described in the paragraph immediately preceding the immediately preceding paragraph, in one embodiment, at least one of the relatively movable masses of the first above-described method can be an additional mass for performing the method. For that, two servo motors and two additional masses can be used, of which one of each is mounted on the rear side and one of each of the front side of the paper-making machine structure to be damped, wherein the movements of the additional masses horizontally and in and counter to the direction of machine travel, whereby pitching vibrations with a horizontal axis arranged perpendicularly to the direction of machine travel and rotational vibrations with vertical axis can be damped. Alternatively, an additional mass or a further additional mass can be mounted on the structure to be damped in such a way that it can perform as essentially vertical movement, and the kinematic measured quantities obtained are sensitive to vertical movements of the structure, whereby natural forms with vertical amplitudes of vibration can be damped.

In another embodiment, in the firse above-described method, the control unit can contain a device which can analyse the frequencies of vibration of the structure from the transmitted kinematic quantities and trigger a corresponding counter-movement between the masses. For that situtation, the analysing device can separate the vibrating natural forms of the structure from each other, can detect the state of vibration of the natural forms and can determine the kinematic quantities of the additional mass relative to the corresponding natural forms. For that situtation, the control unit can drive the servo motor according to the results of the analysing device in such a way that only the natural forms detected by separation are taken into account in vibration damping. Alternatively, the control unit can drive several servo motors which act on different masses.

In another embodiment, in the first above-described method, for continuous measurement and processing in the control unit three scalar quantities can be selected out of the six kinematic quantities which fully describe the movement of a point of the vibratable structure and of the second mass at any movement, which are: absolute position, speed and acceleration of the point of the structure to be damped, as well as position, speed and acceleration of the second mass relative to the said point of the vibratable structure. For that situation, the three selected quantities can be: a) the position of the point of the structure and b) the position of the second mass relative to the connecting point on the structure and c) the speed of the second mass relative to the connecting point. Alternatively, the three selected quantities can be: a) the acceleration of the point of the structure, b) the position of the second mass relative to the connecting point on the structure and c) the speed of the second mass relative to the connecting point. For that situation, the acceleration of the structure and/or the absolute position of the structure can be determined at several places of measurement. Alternatively, the position of the point of the structure can be determined by measuring the curvature of the structure. For that situation, the curvature can be measured by means of at least one wire strain gauge mounted on the structure.

In another embodiment, in the first above-described method, in addition to the servo motor, there can be a further force-applying element in the form of a spring element.

In another embodiment, the present invention is also directed to a servo motor for carrying out the first above-described method wherein for application of force, it contains at least one piezo crystal-containing element. Alternatively, in another embodiment, the servo motor for carrying out the first above-described method can be such that for application of force at least one magnetostrictive element is provided.

In another embodiment, the present invention is also directed to a servo motor for carrying out the first above-described method wherein for application of force a volume varible by a fluid pressure medium can be provided. For such a servo motor, the motor can contain a piston and cylinder system which is adapted to be driven by the fluid pressure medium and which can produce a one-dimensional movement in two directions.

In another embodiment, the present invention also is directed to a servo motor for carrying out the first above-described method wherein a damper is provided for damping relative movement of the masses and wherein the damper is incoporated into the servo motor.

In another embodiment, the present invention is also directed to a device for carying out the first above-described method wherein the force-applying element is adapted to act on the paper-making machine structure in such manner as to couple two parts of the paper-making machine together, wherein at least one of the coupled parts belongs to the frame, wherein at least one of the coupled parts is a rotatable part of the paper-making machine mounted on at least one hydraulic supporting element and at least one supporting element is drivable as a servo motor, and wherein the device contains the movable additional mass and the servo motor, and it is suitable for mounting on the structure of the paper-making machine to be damped.

The advantageous effect of the subject of the invention is due to the fact that movement of thee servo motor follows the control commands of a control circuit, wherein this control circuit processes the kinematic quantities which are an expression of the unwanted vibrations of the structure to be damped. As a result the vibrational movement of the paper-making machine structures is suppressed extremely effectively. This can take place at all frequencies, as the damping device has no restricting natural frequency.

The application of force of the servo motor when carrying out the method according to the invention takes place advantageously either between two vibrating frame members, between the frame and a medium-conducting component, e.g. the breastbox, the frame and the mounting with limited movement of a rotating component, e.g. a roller, or the frame and the additional mass used espressly if occasion arises. Furthermore it is easy to see that on the structure of the paper-making machine to be damped, the point of attachment of the device according to the invention must preferably be located where the amplitude of the vibration to be damped is particulrly high.

It was further found that when carrying out the method using one or more additional masses, the ratio of the additional mass in relation to the mass of the paper-making machine structure to be damped can be kept very much lower than in the case of devices according to the state of the art; nervertheless at the same time a very effective reduction in amplitude of vibration at the paper-making machine can be obtained.

In one advantageous embodiment of the method for damping vibrations on a paper-making machine, by which method relatively movable masses, at least one of which belongs to the vibratable structure of the paper-making machine and wherein mobility can be produced by guides or by elastic deformability, are connected to each other by at least one force-applying element of variable form, the applied force of which is directed against movement of the vibrations, wherein the force-applying element of variable form is a servo motor which is controlled by a control unit for processing signals which are obtainable by measurement of kinematic quantities of the relatively movable masses, wherein at least one of the relatively movable masses is an additional mass for performing the method, wherein two servo motors and two additional masses are used, of which one of each is mounted on the rear side and one of each of the front side of the paper-making machine structure to be damped, wherein the movements of the additional masses horizontally and in and counter to the direction of machine travel, whereby pitching vibrations with a horizontal axis arranged perpendicularly to the direction of machine travel and rotational vibrations with vertical axis can be damped. According to this, two or more such additional masses are mounted on a structure of the paper-making machine to be damped, wherein an arrangement with horizontal parallel directions of movement of the additional masses is recommended, this being in the outer, opposed planes as seen perpendicularly to the direction of machine travel; the rear and front sides are usually spoken of here. For the fact is that an arrangement of this kind damps not only the pitching vibrations in or counter to the direction of machine travel, but also the rotational vibrations with vertical axis of rotation.

Figure 2:
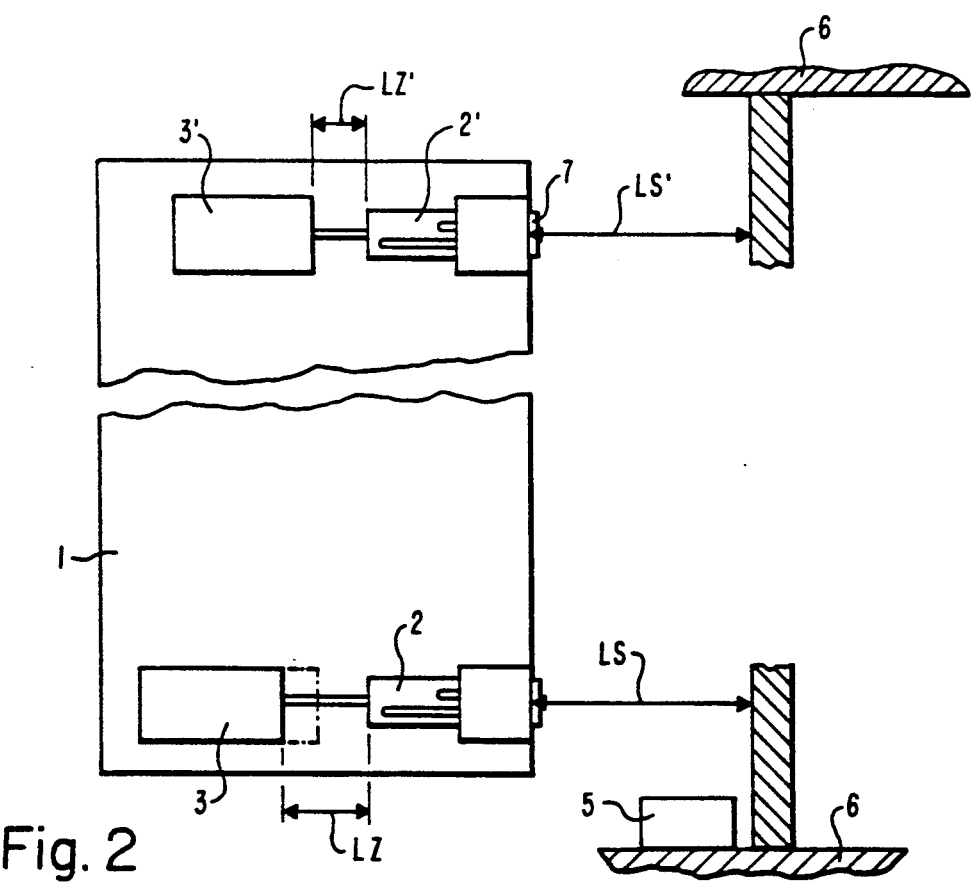
Figure 3:
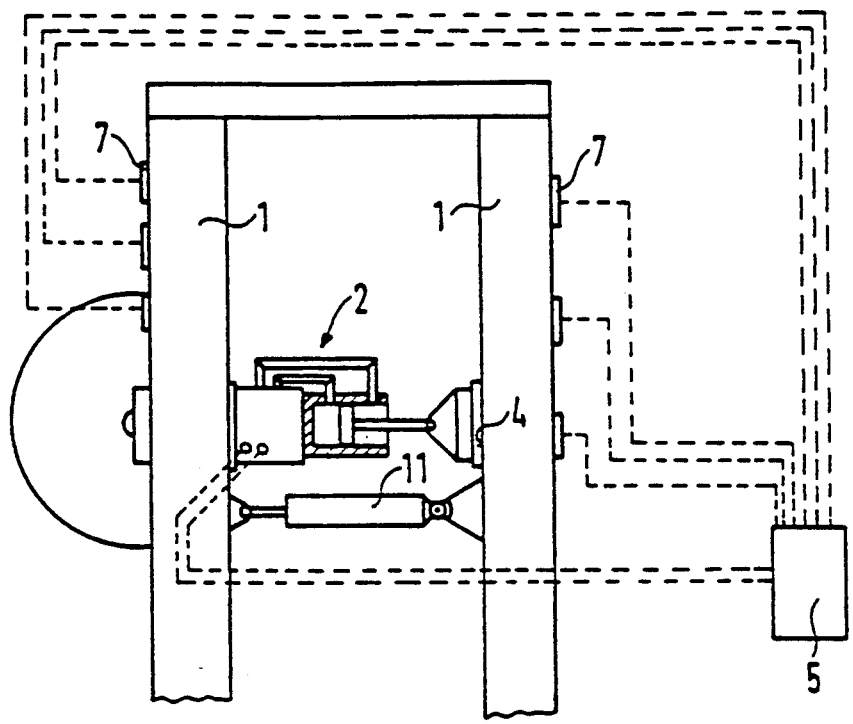
Figure 4:
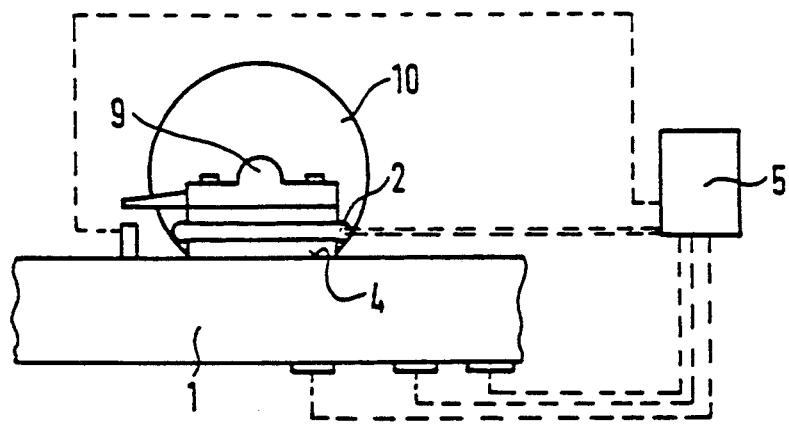
Figure 5A:
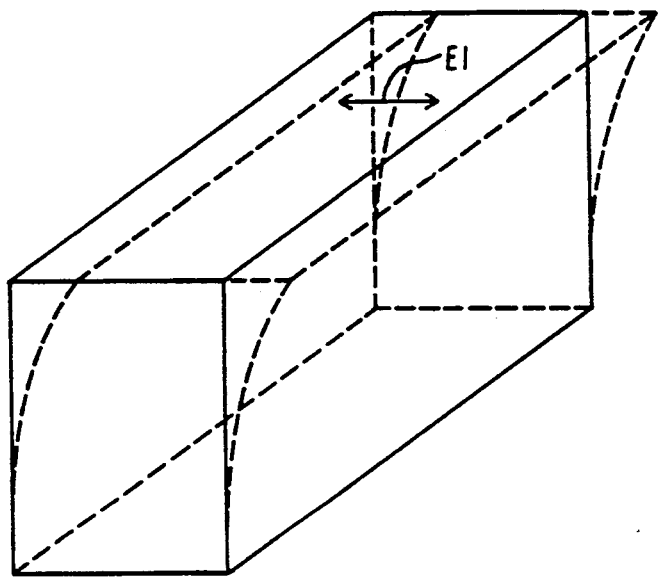
Figure 5B:
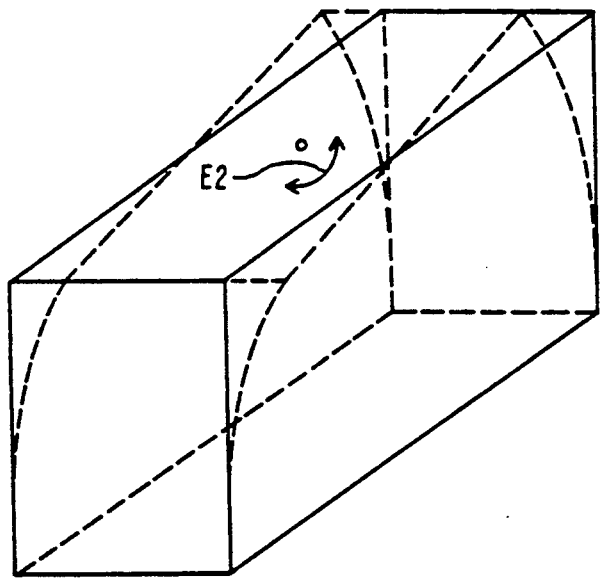

The subject of the invention is described in more detail below and its mode of operation and application are explained. The description relates to drawings which show:

FIG. 1 pratical example within a servo motor and an additional mass, shown schematically in a side view FIG. 2 the same practical example in a view from above FIG. 3 practical example with a servo motor between two frame portions, shown schematically FIG. 4 practical example with a servo motor between frame and mounting of a roller, shown schematically FIGS. 5A and 5B natural forms of the vibrations of a paper-making machine structure shown in simplified form

FIG. 6 graph

Figure 7:
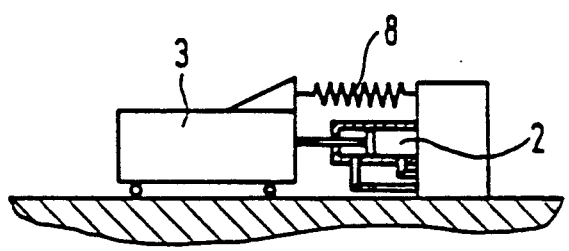

FIG. 7 an arrangement with additional spring element.

FIG. 1 shows part of a paper-making machine structure 1 on which a force-applying element in the form of a servo motor 2 is mounted via mounting point 4. The servo motor acts on a one-dimensionally movable additional mass 3, wherein the direction of this movement also forms the basis of the following measurements. In the example, kinematic quantities of relative movement between additional mass 3 and servo motor 2, such as position LZ, are measured, as well as the kinematic quantities between the structure 1 and the fixed environment 6, such as position LS. Advantageously, measurement of position LS takes place by one or more wire strain gauges 7 which are rigidly connected to the structure 1. A control unit 5 processes the measurement signals which are transmitted to it by signal wires shown in broken lines. From the control unit 5, control commands pass to the servo motor 2 which then moves the additional mass 3. The forces arising as a result conteract the vibrations of the structure. It can be seen that actually occurring vibrations can be superimposed on each other at different frequencies. But by known signal processing methods it is easy to filter out the said frequencies individually if required. Due to the design of the device according to the invention, the additional mass 3 can be moved at any frequency. FIG. 2 shows the structure of FIG. 1 in view from above, additionally showing a second servo motor 2' acting on a second one-dimensionally movable additional mass 3'. FIG. 3 shows an embodiment of the invention in which the relatively moving masses are formed by parts of the frame of the paper-making machine. In this case a servo motor 2 is mounted on the vibratable structure 1 in such a way that it connects to each other two parts of the structure which can perform a vibrational movement relative to each other. Movement of the servo motor 2 is, as described before, controlled by a control unit 5. Then the kinematic values are determined at both parts of the structure 1. The use of an additional mass is superfluous.

The servo motor 2 shown in FIGS. 1 and 3 is a hydraulically operated piston and cylinder system which is supplied with a pressure medium by a pump, not shown. The control pulses from the control unit 5 then act in a manner known in the art on the valves which deflect the stream of pressure medium onto the front or rear side of the piston. Flow of the pressure medium can be guided by relatively small cross-sections, wherein the essentially speed-dependent pressure loss is selected so that the effect of a damper is obtained thereby. But damping can also be produced by a damper 11 provided in addition, FIG. 3.

In FIG. 4 is shown by way of example the arrangement of the servo motor 2 between the vibratable structure 1 and the mounting 9 of a rotatable member such as roller 10. The servo motor, which can advantageously be operated with a piezo crystal or an electromagnet, is controlled by the control unit 5.

FIGS. 5A and 5B illustrate two natural forms of vibrations of paper-making machine structures. In a highly simplified form, a structure of this kind is shown twice in the form of a box, and the deformation which this structure undergoes under the influence of the natural forms of vibrations is shown in broken lines. The movement shown by arrow E1 takes place on account of pitching vibrations, and arrow E2 shows a rotational vibration about a vertical axis. It can be seen that the natural forms are determined by the design of the structure and by the nature of periodic excitation. Other natural forms are therefore readily conceivable. Use of the subject of the invention will advantageously always be aimed at the natural forms to be damped. It is also possible to damp several natural forms simultaneously. For example, in one method contemplated by the present invention for damping vibrations on a paper-making machine, by which method relatively movable masses, at least one of which belongs to the vibratable structure of the paper-making machine and wherein mobility can be produced by guides or by elastic deformability, are connected to each other by at least one force-applying element of variable form, the applied force of which is directed against movement of the vibrations, wherein the force-applying element of variable form is a servo motor which is controlled by a control unit for processing signals which are obtainable by measurement of kinematic quantities of the relatively movable masses, wherein the control unit contains a device which can analyse the frequencies of vibration of the structure from the transmitted kinematic quantities and trigger a corresponding counter-movement between the masses, wherein the analysing device separates the vibrating natural forms of the structure from each other, detects the state of vibration of the natural forms and determines the kinematic quantities of the additional mass relative to the corresponding natural forms, wherein the control unit drives the servo motor according to the results of the analysing device in such a way that only the natural forms detected by separation are taken into account in vibration damping.

Figure 6:
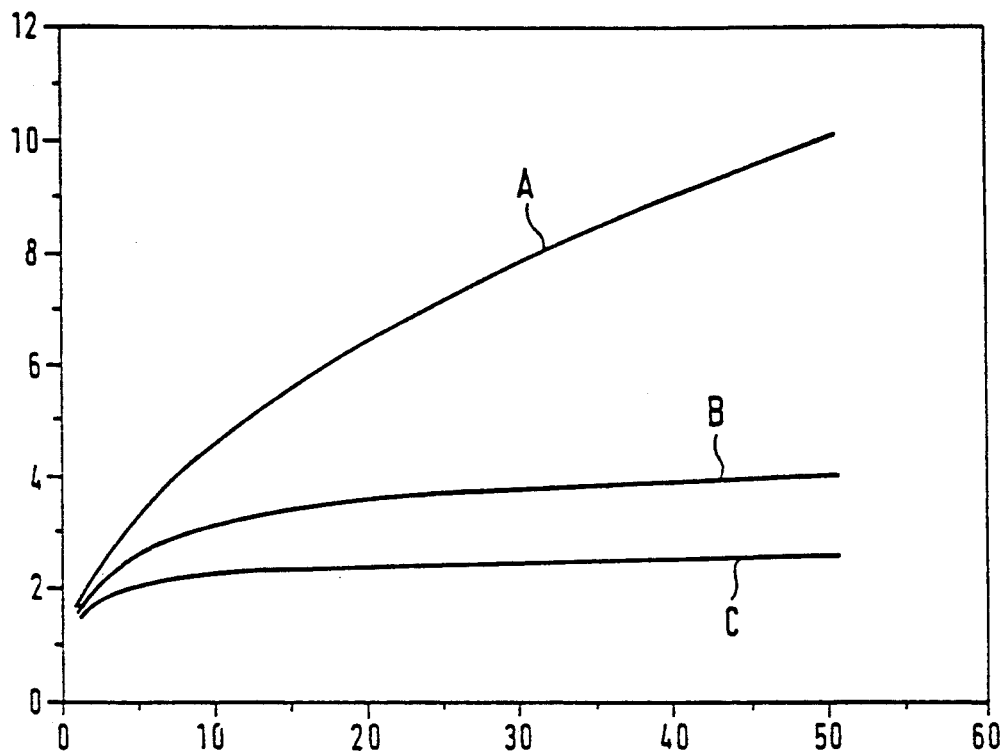

The graph in FIG. 6 shows in the ordinate the maximum amplitude value of the vibration, referred to the static deflection of the structure obtainable by the exciting force, and in the abscissa the ratio of the mass of the vibratable structure to the additional mass of the device according to the invention. Curve A shows the behaviour of a passive damper known from the state of the art, curves B and C the action of the subject of the invention. The parameter of curves B and C here is a factor characterised by the maximum possible deflection of the additional mass, which arises e.g. from the transmission of the servo motor. Here, B has the smaller and C the greater deflection. The diagram makes it clear that considerable damping can be obtained with the device according to the invention, even if a small additional mass is used.

The additional spring element 8 shown schematically in FIG. 7 serves as a safeguard which, in case of failure of the intended functions of the subject of the invention, helps to prevent danger to the plant by an increase in amplitude. The device thus becomes a passive damper.

In another embodiment of the subject of the invention it is also conceivable to move the additional weight in a multi-dimensional path, for which a multi-dimensionally acting, force-applying element as well as correspondingly multi-dimensionally directed measurements of kinematic quantities would be required.

We claim:

1. A method for damping vibrations on a paper-making machine, said method comprising the steps of:
    A. providing a first mass which is movable with respect to a first portion of said paper-making machine;
    B. connecting said first mass to said first paper-making machine portion by means of a variable-force servo motor;
    C. measuring predetermined kinematic quantities of said paper-making machine and of said first mass; and
    D. controlling said servo motor in response to measured kinematic quantities so that forces on said first paper-making machine portion due to said first mass oppose said vibrations.

2. A method according to claim 1 further comprising the step of:
    E. damping relative movement of said first mass and said first paper-making machine portion.

3. A method according to claim 1 wherein said first mass is a second portion of the paper-making machine and step B comprises the step of:
    B1. connecting said first paper-making machine portion to said second paper-making machine portion by means of said variable-force servo motor.

4. A method according to claim 3 wherein said paper-making machine has a frame and step B1 comprises the step of:
    B2. connecting said first paper-making machine portion to part of said frame by means of said variable-force servo motor.

5. A method according to claim 3 wherein said paper-making machine comprises a mechanism for transporting a paper web and step B1 comprises the step of:
    B3. connecting said first paper-making machine portion to said transporting mechanism.

6. A method according to claim 3 wherein said second paper-making machine portion comprises a member rotatable with respect to said first paper-making machine portion and means for mounting said rotatable member on said first paper-making machine portion and step B1 comprises the step of:
    B4. connecting said first paper-making machine portion to said mounting means.

7. A method according to claim 6 wherein said mounting means comprises at least one hydraulic supporting element, and step B comprises the step of:
    B5. controlling said supporting element to act as a servo motor.

8. A method according to claim 1 further comprising the steps of:
    F. providing a second mass which is movable with respect to a second portion of said paper-making machine;
    G. connecting said second mass to said second paper-making machine portion by means of a second variable-force servo motor;
    H. measuring predetermined kinematic quantities of said paper-making machine and of said second mass; and
    I. controlling said second servo motor in response to measured kinematic quantities so that forces on said second paper-making machine portion due to said second mass oppose said vibrations.

9. A method according to claim 8 wherein step A comprises the step of:
    A1. mounting said first mass on one side of said paper-making machine so that said first mass is constrained to move horizontally; and
step F comprises the step of:
    F1. mounting said second mass on a side of said paper-making machine opposite said one side so that said second mass is constrained to move horizontally, whereby pitching vibrations with a horizontal axis arranged perpendicularly to the direction of paper web travel and rotational vibrations with vertical axis can be damped.

10. A method according to claim 1 further comprising the steps of:
    J. mounting a third mass on said paper-making machine so that said third mass is constrained to move in a vertical direction;
    K. connecting said third mass to said paper-making machine by means of a third variable-force servo motor;
    L. measuring predetermined kinematic quantities sensitive to vertical movements of said paper-making machine and of said third mass; and
    M. controlling said third servo motor in response to measured kinematic quantities so that forces on said paper-making machine due to said third mass oppose said vibrations, whereby vertical amplitudes of vibration can be damped.

11. A method according to claim 9 wherein steps D and M are carried out by a single control unit.

12. A method according to claim 1 wherein step C comprises the step of:
    C1. frequency analyzing said paper-making machine vibrations using said measured kinematic quantities.

13. A method according to claim 12 wherein step C1 comprises the steps of:
    C2. separating said paper-making machine vibrations into natural free oscillation frequencies of said paper-making machine;
    C3. detecting a phase and a frequency of each of said natural free oscillation frequencies; and
    C4. calculating desired kinematic quantities for moving said mass relative to corresponding ones of said natural free oscillation frequencies.

14. A method according to claim 13 wherein step D comprises the step of:
    D1. controlling said servo motor in response to kinematic quantities calculated in step C4 so that the natural free oscillation frequencies are damped.

15. A method according to claim 1 wherein step C comprises the step of:
    C5. measuring three scalar kinematic quantities selected from the group consisting of the absolute position, speed and acceleration of said first portion of said paper-making machine and the absolute position, speed and acceleration of said first mass.

16. A method according to claim 15 wherein step C5 comprises the steps of:

C6. measuring the absolute position of said first portion of said paper-making machine;

C7. measuring the position of said first mass relative to said first portion of said paper-making machine; and C8. measuring the speed of said first mass relative to said first portion of said paper-making machine.

17. A method according to claim 15 wherein step C5 comprises the steps of:

C9. measuring the acceleration of said first portion of said paper-making machine;

C10. measuring the position of said first mass relative to said first portion of said paper-making machine; and C11. measuring the speed of said first mass relative to said first portion of said paper-making machine.

18. A method according to claim 1 wherein step C comprises the step of:

C12. measuring said kinematic quantities of said first portion of said paper-making machine at several places on said paper-making machine.

19. A method according to claim 1 wherein step C comprises the step of:

C13. measuring the curvature of said first portion of said paper-making machine to determine the position of said first portion of said paper-making machine.

20. A method according to claim 19 wherein step C13 comprises the step of:

C14. attaching at least one wire strain gauge to said first portion of said paper-making machine.

21. A method according to claim 1 further comprising the step of:

N. attaching a spring element between said first mass and said first portion of said paper-making machine.

22. A method according to claim 1 wherein step B comprises the step of:

B6. connecting said first mass to said first paper-making machine portion by means of a piezoelectric crystal element.

23. A method according to claim 1 wherein step B comprises the step of:

B7. connecting said first mass to said first paper-making machine portion by means of a magnetostrictive element.

24. A method according to claim 1 wherein step B comprises the step of:

B8. connecting said first mass to said first paper-making machine portion by means of a hydraulic servo motor.

25. A method according to claim 24 wherein step B8 comprises the step of:

B9. connecting said first mass to said first paper-making machine portion by means of a hydraulic servo motor containing a piston and a cylinder which is driven by a pressurized fluid medium and which can produce a one-dimensional movement in two directions.

26. A method according to claim 1 wherein step B comprises the step of:

B10. connecting said first mass to said first paper-making machine portion by means of a variable-force servo motor incorporating a damping element.

27. A method according to claim 3 wherein said first mass is a means for conducting a medium and step B1 comprises the step of:

B11. connecting said first paper-making machine portion to said conducting means.

* * * * *